Jan. 10, 1967     L. HEDSTROM     3,296,697

GRASS SHEARS

Filed Nov. 6, 1964

INVENTOR.
Lars Hedstrom by Sparrow and Sparrow

ATTORNEYS.

United States Patent Office 3,296,697
Patented Jan. 10, 1967

3,296,697
GRASS SHEARS
Lars Hedstrom, Mendham, N.J., assignor to J. Wiss and Sons Co., Essex, N.J., a corporation of New Jersey
Filed Nov. 6, 1964, Ser. No. 409,482
9 Claims. (Cl. 30—248)

This invention relates generally to grass shears and more particularly to improvements relating to the structure of this type of shears.

The primary object of the present invention resides in the development and production of low-cost grass shears which, among other features, include features normally found only in higher priced grass shears.

A further object of the present invention is to provide grass shears of new, efficient and simple construction, and which comprises a minimum of parts.

Yet another object of the present invention is to provide grass shears of improved structure by which the movable cutting blade is pulled against the stationary blade when resistance between the cutting blade edges is met.

A still further object of the present invention is to provide grass shears embodying a single spring for both keeping the shearing blades canted and together at the beginning of the stroke and also for returning the blades, after the shearing stroke, to their starting position.

Yet a still further object of the present invention is to provide grass shears which can be easily and economically manufactured and which can be easily re-sharpened.

Various further and more specific purposes, features and advantages will clearly appear from the detailed description given below, taken in connection with the accompanying drawing, which forms part of the specifications and illustrates merely by way of example embodiments of the device of the invention.

The invention consists in the novel parts, construction arrangements, combinations and improvements as may be shown and described in connection with grass shears herein disclosed by way of example only and as illustrative of preferred embodiments.

In the following rescription and in the claims, parts will be identified by specific names for convenience, but such names are intended to be as generic in their application to similar parts as the art will permit. Like reference characters denote like parts in the several figures of the drawing, in which:

Figure 1:
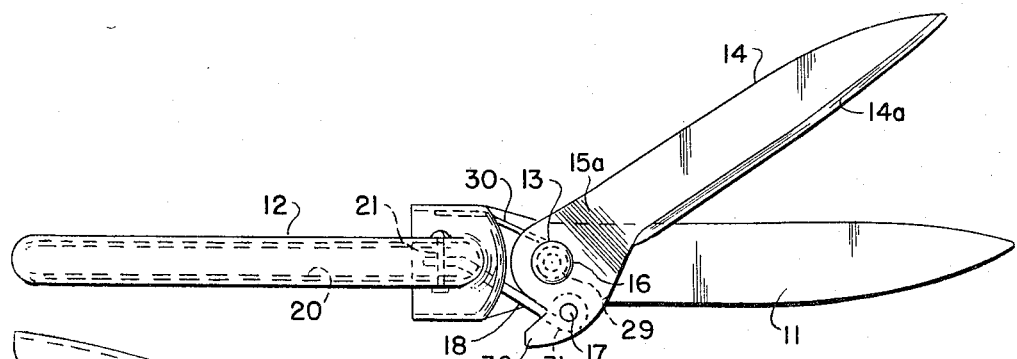
FIG. 1 is a plan view of grass shears according to an embodiment of the invention, the blades being shown spread for a cutting operation.

The desirability of the invention is to create a low-cost grass shears, which includes some of the features found only in higher priced grass shears, and in order to obtain these advantageous features, unobvious reconstruction and designing was required. Although of somewhat lighter construction, the inexpensive shears, according to the invention, cut efficiently and compare very favorably with other high-quality shears. This is due to the fact that shears according to this design have the same down-pulling action on the movable top blade in a more direct and simpler construction with fewer parts. By raising the pivot point of the top blade and pulling it into closure from a point well below the pivot point, when the blade meets an obstruction, during the closing stroke of the shears, the top movable blade is forced against the edge of the bottom stationary blade to the extent that the top blade, which normally has a slight curvature, actually bends and flattens itself against the bottom blade. The top blade is, therefore, not permitted to skip over, miss or bend between the blades any material (such as grass or stubble), which it has the power to cut. In order to assure a sufficient degree of this same down pressure at the beginning of the closng stroke and when the blades meet negligible resistance, the raised offset rear end pivot portion or plateau of the top movable blade is formed with a slight rearwardly directed, downward slope so that the upward pressure of the spring forces the blade against the larger head of the pivot stud which, in turn, cants the whole top blade downward into solid pressure contact with the edge of the bottom blade during its entire stroke. At the same time and in the same manner, said rear end pivot portion or plateau of the top movable blade is formed with a slight sidewardly directed, downward slope or angle so that the spring will slightly cant the leading edge of the top blade into cutting contact with the bottom blade rather than the flat or heel side of the blade first. It will be observed from the specification detailed below that the pivot hole or opening in the top movable blade is made slightly oversized to allow the slight canting of the blade downward and sideways, and to allow the top blade to be lifted up in the closed position for re-sharpening.

The embodiment of the invention disclosed herein utilizes but a single spring which serves two purposes. It acts as a compression spring to force the top movable blade's heel or rearward portion or plateau to ride against the head of the pivot stud and give the desired cant; it also acts as a torsion spring to return the blade to the open position.

Reference will now be made in more detail to the accompanying drawing illustrating a preferred embodiment and a detail variation thereof by which the invention may be realized. A substantially flat stationary blade 11 is fixed at its rear end to a stationary handle 12. Stationary handle 12 is preferably a single piece of suitable material, such as metal bent to form an inclined grip portion 12a which is substantially U-shaped in section from which depends a wider portion having the spread side walls 12b terminating in inwardly directed bent lugs 12c, and a front wall portion 12d. Stationary blade 11 is fixed at its rear end to lugs 12c. Wall portion 12d terminates above fixed or stationary blade 11 providing a transverse opening 12e. A vertical shaft or stud 13 is attached to stationary blade 11 near its rear end. A movable blade 14 has a cutting or shearing portion 14a which is preferably slightly curved longitudinally and has a raised rear end or heel portion 15 which is offset from the plane of the blade as indicated at 15a, providing a pivot portion or plateau by which blade 14 is pivotally mounted on shaft or stud 13. Stud 13 has an upper enlarged end or head 16 which acts as a "ride" for movable blade 14. Raised rear end or plateau 15 of movable blade 14 is slightly inclined in two directions, namely downwardly to the rear and to the side.

The raised rear end portion has a downwardly projecting pin 17 fixed thereto and spaced from shaft 13. A torsion spring 29 is wound around shaft 13. Free end 30 of spring 29 is held abuttingly against one side wall 12b of stationary handle 12, and the other free end 31 of spring 29 is hooked about an enlarged portion of pin 17. Where flat plate 19 is used instead of link 18, pin 17 is provided with slightly larger free end 17a extending alongside the rear edge 28 of stationary blade 11 (see FIG. 5).

Figure 2:
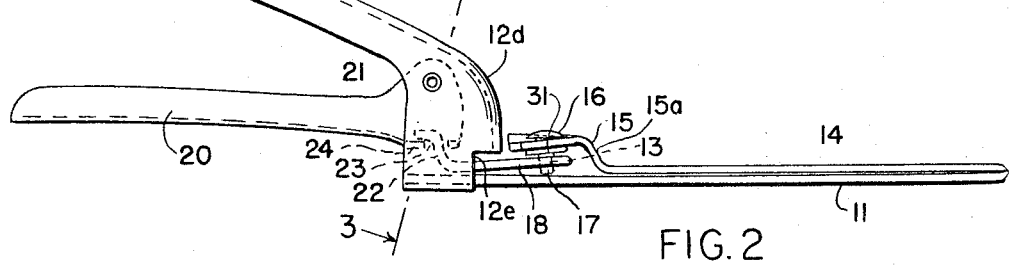
FIG. 2 is a side elevation of the grass shears shown in FIG. 1.
Figure 3:
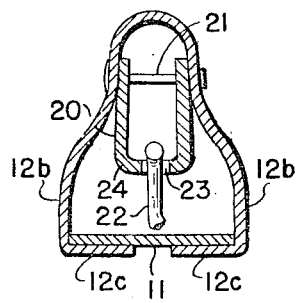
FIG. 3 is a section of the structure of grass shears shown in FIG. 2, taken along the line 3—3.
Figure 4:
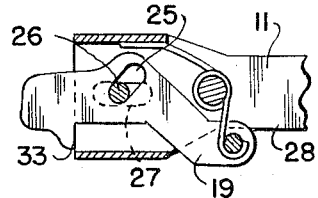
FIG. 4 illustrates a detail of the shears, partly broken away, having a link plate substituted for the bent wire link shown in FIGS. 1 and 2.
Figure 5:
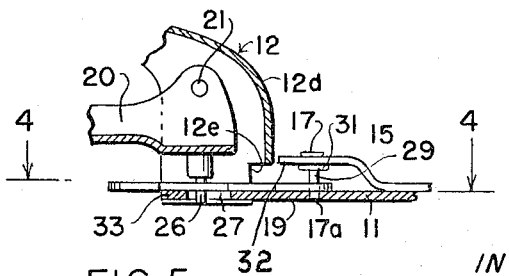
FIG. 5 is a vertical section of grass shears having a link plate such as shown in FIG. 4, partly broken away.

Pin 17 provides a pivotal point for a pulling link 18 which may either consist of bent wire (FIGS. 1 and 2), or of a flat plate 19 (FIGS. 4 and 5). A movable operating handle 20 is provided for actuating blade 14. Handle 20 preferably is swingably or pivotally mounted on a horizontal shaft 21 which extends through the sides of the substantially U-shaped stationary handle 12. As shown in FIGS. 1 and 2, the upwardly bent end 22 of link 18 is latched onto handle 20 through a hole 23 in the bottom 24 of handle 20. Hole 23 is oversized in order to give link 18 sufficient freedom of motion (FIG. 3).

The pivot hole in rear or heel end 15 of blade 14 is slightly oversized so that blade 14, due to the slight inclination of rear end 15 in two directions, "cants" downwards and sideways in order to assure a sufficient degree of down pressure of said blade at the beginning of the cutting stroke and at the occasion of some harder resistance or obstruction between the blades. Rear end 15 has a downwardly projecting pin 17 fixed thereto and spaced from shaft or stud 13.

As heretofore stated, instead of link 18, flat plate 19 may be used as pulling member, as shown in FIGS. 4 and 5. Plate 19 has an oversized, slotted hole 25, and bottom 24 of handle 20 has a downwardly projecting pin 26 engaging hole 25. In order to assure a substantially straight line motion of plate 19, a slot 27 is provided in the bottom of the rear end of stationary blade 11 in which pin 26 can move freely forward and backward. Plate 19 (FIG. 5) is provided at its rear end with a protruding hook 33 adapted, when swung about pin 17, to be latched onto one of the walls 12b of stationary handle 12 at the rear thereof when the blades of the shears are in closed superimposed inoperative position.

Rear end portion 15 of movable blade 14 (in both embodiments FIG. 1 and 5) has a protruding abutment 32 which limits additional forward movement of movable blade 14 by contacting the front wall 12d of handle 12.

Shears according to the invention are of light and simple construction and embody the very desirable feature in that the movable blade 14 has the same down-pulling action as that found in more elaborate and more costly heavier shears of the same class. By having raised the pivot point of the movable blade and by pulling it into shearing action from a point well below the pivot point, the cutting edge of the movable blade is forced against the cutting edge of the stationary blade, particularly when a harder obstruction between the blades occurs. Thus, the movable blade is prevented from skipping over, bending some material between the blades (grass or stubble) which otherwise it has the power to cut.

This action is enhanced by the "canting" of the movable blade due to the slight rearward and sideways inclination of the raised rear end portion 15 thereof in conjunction with the large head 16 of the pivot shaft 13 which acts as a "ride" for the movable blade and against which the raised rear end portion 15 is pressed by spring 29 coiled around the pivot shaft 13. Obviously, spring 29 provides for the return stroke of the shears, acting as a torsion spring.

While the invention has been described and illustrated with respect to a certain preferred example which gives satisfactory results, it will be understood by those skilled in the art after understanding the principle of the invention, that various other changes and modifications may be made without departing from the spirit and scope of the invention, and it is intended therefore in the appended claims to cover all such changes and modifications.

I claim:

1. Shears comprising a stationary blade, a fixed handle member connected to said stationary blade at its rear end portion, a shaft projecting upwardly from said stationary blade at a point forward of its said rear end portion, a movable blade having a raised rear end portion, said raised portion having an opening through which a portion of said shaft extends, said opening being larger than the cross-section of the extending portion of said shaft at which said raised portion of said movable blade is pivotally connected to said shaft, said shaft having a head larger than said opening and being disposed over and contactable with said raised portion of said movable blade, a movable handle member pivotally connected to said fixed handle member, a link connected to said movable handle member and being substantially in parallel relation to said stationary blade, a pin projecting downwardly from said raised rear end portion, said link being pivotally connected to said pin, and a torsion spring about said shaft and interposed between said rear end portion of said movable blade and said stationary blade and maintaining said blades in resilient contact relation, said spring having an extended end bearing against said fixed handle member, said blades being manipulatable for a cutting operation by pivotal movement of said movable handle member towards said stationary handle member.

2. Shears according to claim 1, said raised rear end portion having a rearwardly directed, downward slope.

3. Shears according to claim 1, said raised rear end portion having a rearwardly and sidewardly directed downward slope.

4. Shears comprising a stationary blade, a fixed handle member connected to said stationary blade at its rear end portion, a shaft having a large head and projecting from said stationary blade at a point forward of its rear end portion, a movable blade having a raised rear end portion which rearwardly and sidewardly slopes downward, said movable blade being pivotally connected at said rear end portion to said shaft, below said head, said head functioning as a ride for said movable blade, a movable handle member pivotally connected to said fixed handle member, a link connected to said movable handle and being substantially in parallel relation to and being located between said movable and said stationary blades, said link being pivotally connected to said movable blade at its said rear end portion, and a torsion spring about said pivot shaft and interposed between said rear end portion of said movable blade and said stationary blade and maintaining said blades in resilient contact relation, said spring having an extended end bearing against said fixed handle member, said blades being manipulatable for a cutting operation by pivotal movement of said movable handle member towards said stationary handle member.

5. Shears according to claim 1, and said link being pivotally connected to said downwardly and sidewardly sloped end of said raised rear end portion of said movable blade and at a point thereof substantially lower than said ride.

6. Shears comprising a stationary blade having a rear end portion, a fixed handle member connected to said stationary blade at said portion, a shaft projecting from said blade forwardly of said portion, a movable blade having a rear end raised portion rotatably mounted on said shaft, a movable handle member pivotally connected to said fixed handle member, a slidable plate superimposing said stationary blade, means connecting said plate to said movable handle member, means pivotally connecting said plate to said movable blade at said raised portion, torsion means interposed between said raised portion and said rear end portion and maintaining said blades in resilient contact relation, said torsion means bearing against said fixed handle member, said blades being manipulatable for a cutting operation by the pivotal movement of said movable handle member towards said stationary handle member.

7. Shears according to claim 6, said rear end portion of said stationary blade having a longitudinal slot, and said means connecting said plate to said movable handle member having an extension projecting in said slot.

8. Shears according to claim 6, said plate having a protruding hook forming an abutment against said stationary handle member, said hook arranged for holding said blades in a closed position.

9. Shears according to claim 6, said means pivotally connecting said plate to said movable blade having a free end which bears laterally against the outer edge of said stationary blade.

References Cited by the Examiner
UNITED STATES PATENTS

| | | | |
|---|---|---|---|
| 2,853,777 | 9/1958 | Alofs | 30—248 |
| 2,864,164 | 12/1958 | Wallace | 30—248 |
| 2,923,058 | 2/1960 | Binkley | 30—248 |
| 2,958,944 | 11/1960 | Wertepny et al. | 30—248 |
| 3,036,379 | 5/1962 | Katzfey | 30—248 |

WILLIAM FELDMAN, *Primary Examiner.*

J. C. PETERS, *Assistant Examiner.*